US010500804B2

(12) United States Patent
Bender

(10) Patent No.: US 10,500,804 B2
(45) Date of Patent: Dec. 10, 2019

(54) METHOD OF PREPARING A BOTTOM SURFACE OF A PRECURED TIRE TREAD

(71) Applicant: Bridgestone Bandag, LLC, Muscatine, IA (US)

(72) Inventor: David L. Bender, Muscatine, IA (US)

(73) Assignee: Bridgestone Bandag, LLC, Muscatine, IA (US)

( * ) Notice: Subject to any disclaimer, the term of this patent is extended or adjusted under 35 U.S.C. 154(b) by 428 days.

(21) Appl. No.: 15/102,661

(22) PCT Filed: Dec. 16, 2014

(86) PCT No.: PCT/US2014/070454
§ 371 (c)(1),
(2) Date: Jun. 8, 2016

(87) PCT Pub. No.: WO2015/095103
PCT Pub. Date: Jun. 25, 2015

(65) Prior Publication Data
US 2016/0311186 A1 Oct. 27, 2016

Related U.S. Application Data

(60) Provisional application No. 61/918,017, filed on Dec. 19, 2013.

(51) Int. Cl.
*B29D 30/06* (2006.01)
*B29D 30/56* (2006.01)
*B29D 30/54* (2006.01)

(52) U.S. Cl.
CPC .......... *B29D 30/0662* (2013.01); *B29D 30/56* (2013.01); *B29D 2030/541* (2013.01)

(58) Field of Classification Search
None
See application file for complete search history.

(56) References Cited

U.S. PATENT DOCUMENTS 2,976,910 A * 3/1961 Nowak ................. B29D 30/56
156/129
4,088,521 A 5/1978 Neal
(Continued)

FOREIGN PATENT DOCUMENTS

| JP | H07108629 | 4/1995 |
| WO | 2013002823 | 1/2013 |
| WO | 2013130070 | 9/2013 |

OTHER PUBLICATIONS

International Search Report and Written Opinion; Corresponding PCT Application No. PCT/US2014/070454 filed Dec. 16, 2014; Authorized Officer Myung Jin Lee; dated Mar. 31, 2015.
(Continued)

*Primary Examiner* — Seyed Masoud Malekzadeh
*Assistant Examiner* — Manley L Cummins, IV

(57) ABSTRACT

A method of preparing a precured tire tread includes forming a green tire tread strip having a top surface and a bottom surface. The method also includes curing the green tire tread strip to form a precured tire tread having a top surface and a bottom surface. The method further includes abrasive blasting the bottom surface of the precured tire tread, air blasting the bottom surface of the precured tire tread, and washing the bottom surface of the precured tire tread with a liquid.

20 Claims, 3 Drawing Sheets

(56) References Cited

U.S. PATENT DOCUMENTS

| | | | |
|---|---|---|---|
| 5,759,322 A | 6/1998 | Courel et al. | |
| 6,668,884 B2 | 12/2003 | Koch et al. | |
| 7,232,498 B2 | 6/2007 | Zimmer et al. | |
| 8,267,134 B2 | 9/2012 | Mayni et al. | |
| 2002/0179214 A1 | 12/2002 | Majumdar et al. | |
| 2007/0209325 A1* | 9/2007 | Lelio | B29D 30/56 53/434 |
| 2009/0205762 A1* | 8/2009 | Mayni | B29D 30/56 152/209.1 |
| 2012/0090767 A1* | 4/2012 | Basile | B29D 30/3007 156/128.6 |
| 2013/0139938 A1 | 6/2013 | Kouno et al. | |

OTHER PUBLICATIONS

International Preliminary Report on Patentability; Corresponding PCT Application No. PCT/US2014/070454 filed Dec. 16, 2014; Authorized Officer Yukari Nakamura; dated Jun. 21, 2016.

\* cited by examiner

METHOD OF PREPARING A BOTTOM SURFACE OF A PRECURED TIRE TREAD

FIELD OF INVENTION

The present disclosure relates to the field of tire retreading and precured tire treads. More particularly, the present disclosure relates to the field of tire retreading, precured tire treads having a prepared bottom surface for receiving cement or an adhesive during a tire retreading process, and a method for making same.

BACKGROUND

Retreading of a tire may comprise removing a worn tread from a tire casing by a buffing process. A molded, precured tread is cut to an appropriate length so that it can be wound about the tire casing with a first end abutting a second end. An adhesive is applied to the tire casing, the precured tread, or both the tire casing and the precured tread. Additionally, cement may also be applied to the tire casing, the precured tread, or both the tire casing and the precured tread. In one known embodiment, the precured tire tread is formed by curing a green tire tread strip in a tire tread vulcanization mold. The precured tire tread is then allowed to cool, and wire brushes are used to roughen a bottom surface of the precured tire tread.

SUMMARY OF THE INVENTION

In one embodiment, a method of preparing a precured tire tread includes forming a green rubber mixture and extruding the green rubber mixture into a green tire tread strip having a top surface and a bottom surface. The method further includes placing the green tire tread strip in a tire tread vulcanization mold and curing the green tire tread strip to form a precured tire tread having a top surface and a bottom surface. The curing includes applying heat of at least 150° C. The method further includes removing the precured tire tread while the precured tire tread has a temperature of at least 120° C. The method also includes abrasive blasting the bottom surface of the precured tire tread while the precured tire tread has a temperature of at least 80° C.

In another embodiment, a method of preparing a precured tire tread includes forming a green tire tread strip having a top surface and a bottom surface. The method also includes curing the green tire tread strip to form a precured tire tread having a top surface and a bottom surface. The method further includes abrasive blasting the bottom surface of the precured tire tread, air blasting the bottom surface of the precured tire tread, and washing the bottom surface of the precured tire tread with a liquid.

In yet another embodiment, a method of retreading a tire includes providing a tire casing and providing a green tire tread strip having a bottom surface, a first end, and a second end. The method further includes curing the green tire tread strip to form a precured tire tread having a top surface and a bottom surface. The curing includes applying heat of at least 150° C. The method also includes abrasive blasting the bottom surface of the precured tire tread while the precured tire tread has a temperature of at least 80° C. The method further includes applying a substance to one of the tire casing and the bottom surface of the precured tire tread, and winding the precured tire tread around the tire casing.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Tread" as used herein, refers to that portion of the tire that comes into contact with the road or ground under normal inflation and load.

While similar terms used in the following descriptions describe common tire components, it should be understood that because the terms carry slightly different connotations, one of ordinary skill in the art would not consider any one of the following terms to be purely interchangeable with another term used to describe a common tire component.

Figure 1:
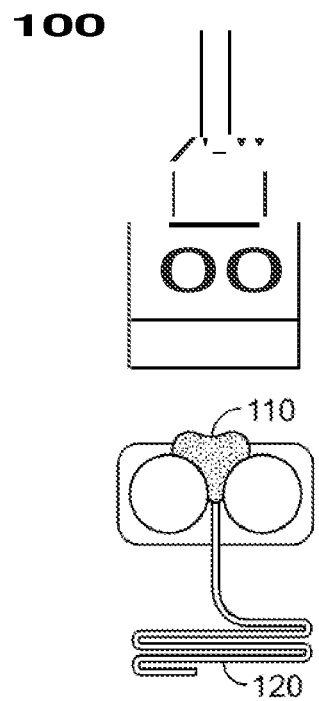
FIG. 1 is a schematic drawing of an exemplary mixing device for producing a green rubber mixture.

FIGS. 1-4 are schematic illustrations of different stations in a system for preparing a precured tire tread. FIG. 1 is a schematic drawing of an exemplary mixing device 100 for receiving one or more compounds 110. The mixing device 100 mixes the one or more compounds 110 to produce a green rubber mixture 120. The details of mixing devices are known in the art and are not repeated here.

Figure 2:
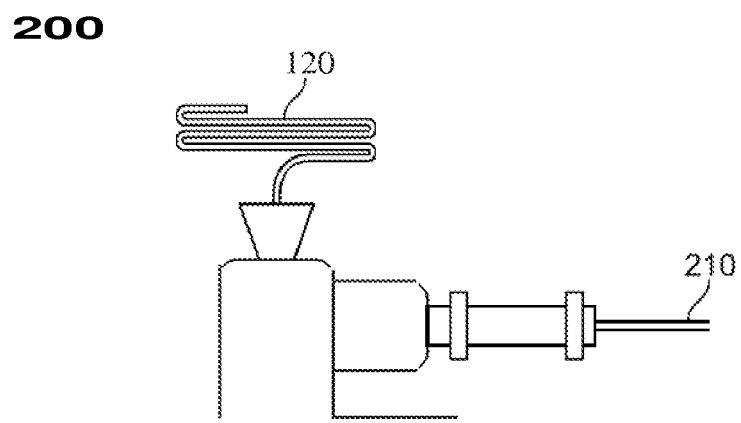
FIG. 2 is a schematic drawing of an exemplary extruding device for extruding a green tire tread strip.

The green rubber mixture 120 is fed into an extruding device, such as the exemplary extruding device 200 shown schematically in FIG. 2. The extruding device 200 extrudes the green rubber mixture 120 into a continuous green strip 210 that is cut to a desired size. The green tire tread strip has a top surface and a bottom surface. The details of extruding devices are known in the art and are not repeated here.

In the illustrated embodiment, the mixing device 100 and the extruding device 200 are shown as separate machines. In an alternative embodiment (not shown), a single machine may function as both a mixing device and an extruding device.

In an alternative embodiment, the green tire tread strip may be formed by a 3D printing or additive manufacturing process. In such an embodiment, the mixing device and extruding device may be omitted.

Figure 3:
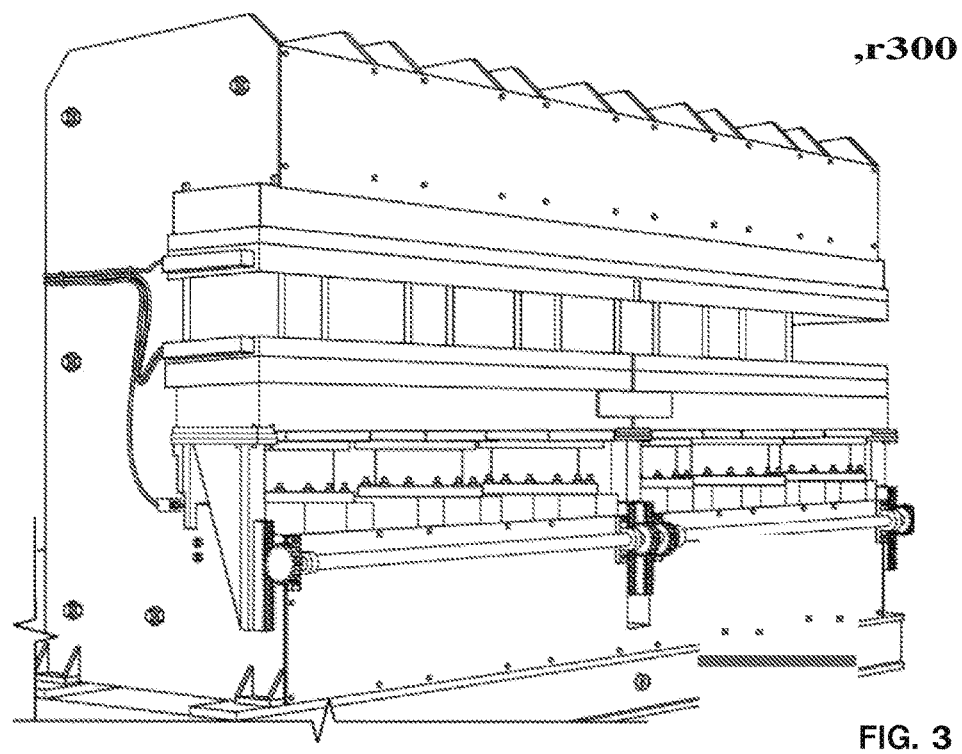
FIG. 3 is a schematic drawing of an exemplary tire tread vulcanization mold.

The green tire tread strip is placed in a tread vulcanization mold, such as the exemplary tire tread vulcanization mold 300 illustrated in FIG. 3. The details of tire tread vulcanization molds are known in the art and are not repeated here.

The green tire tread strip may first be cut to an appropriate length according to the dimensions of the tread vulcanization mold 300. In one known embodiment, the green tire tread strip is cut to a length of approximately 30 feet (9 meters). However, it should be understood that the green tire tread strip may be cut to any desired length. The tire tread vulcanization mold 300 cures the green tire tread strip by applying heat and pressure, thereby forming a precured tire tread having a top surface and a bottom surface. In one embodiment, the tire tread vulcanization mold 300 applies heat of about 350° F. (180° C.) with pressures of about 350 PSI (2400 kPa). In alternative embodiments, the tire tread vulcanization mold 300 applies heat of about 300-400° F. (150-200° C.) with pressures of about 200-850 PSI (1370-5800 kPa).

In one embodiment, the applied heat and pressure raises the temperature of the tire tread to a temperature of 400° F. (200° C.). In alternative embodiments, the applied heat and pressure raises the temperature of the tire tread to a temperature of about 250-400° F. (120-200° C.).

The precured tire tread may be removed from the tire tread vulcanization mold 300 before it is substantially cooled. In one embodiment, the precured tire tread has a temperature of 400° F. (200° C.) when it is removed from the tire tread vulcanization mold 300. In alternative embodiments, the precured tire tread has a temperature of about 250-400° F. (120-200° C.) when it is removed from the tire tread vulcanization mold 300.

Alternatively, the precured tire tread may be formed by a 3D printing or additive manufacturing process. In such an embodiment, although the step of curing a green tire tread strip in a tire tread vulcanization mold would be omitted, the resulting tire tread may still be referred to as "pre-cured," because it has physical properties similar to that of a tire tread that has been cured in a tire tread vulcanization mold, or because a full curing process is unnecessary.

Figure 4:
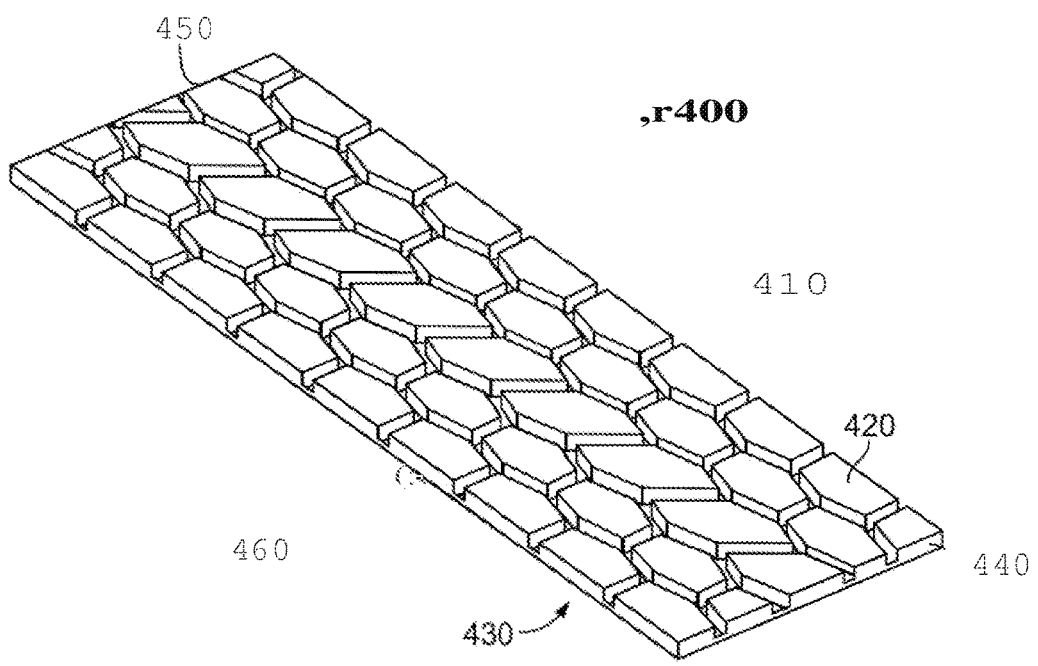
FIG. 4 is a schematic drawing of one embodiment of a precured tire tread and a nozzle of an abrasive blasting device.

FIG. 4 is a schematic drawing of one embodiment of a precured tire tread 400. The precured tire tread 400 includes a top surface 410 having a plurality of tread elements 420 thereon. In the illustrated example, the tread elements are a plurality of lugs separated by a plurality of grooves. In alternative embodiments, the tread elements may include ribs, bars, and blocks as well as additional grooves, sipes, and other tread elements.

The precured tire tread 400 also includes a bottom surface 430, a front surface 440, and a rear surface 450. While the example precured tire tread 400 is shown as having a generally rectangular cross-section, it should be understood that the cross-section may be generally trapezoidal or include any number of straight or curved surfaces.

To prepare the precured tire tread 400 to be affixed to a tire casing, one or more surfaces may be buffed or roughened to remove nonstick surface agents. In the illustrated embodiment an abrasive blasting nozzle 460 is used to perform an abrasive blasting by forcibly propelling a stream of abrasive material against the bottom surface 430 of the precured tire tread 400.

The abrasive blasting of the bottom surface 430 of the precured tire tread 400 may be performed without waiting for the precured tire tread 400 to substantially cool. By eliminating a cooling step, or reducing the amount of time that the precured tire tread cools, throughput may be increased in the production of precured tire treads. In one known embodiment, the abrasive blasting of the bottom surface 430 of the precured tire tread 400 is performed while the precured tire tread has a temperature of at least 170° F. (80° C.). In another known embodiment, the abrasive blasting of the bottom surface 430 of the precured tire tread 400 is performed while the precured tire tread has a temperature of at least 210° F. (100° C.). In yet another known embodiment, the abrasive blasting of the bottom surface 430 of the precured tire tread 400 is performed while the precured tire tread has a temperature of at least 250° F. (120° C.). In other embodiments, the temperature of the precured tire tread 400 may be as high as 400° F. (200° C.) when the abrasive blasting of the bottom surface 430 is performed. However, it should be understood that the abrasive blasting may be performed when the precured tire tread 400 is at an ambient temperature.

In one embodiment, the abrasive blasting step is done only with solidified gas, such as carbon dioxide. In another embodiment, the abrasive blasting is performed by propelling a stream of particulates at the bottom surface 430 of the precured tire tread 400. Examples of particulates used for abrasive blasting include, without limitation, sand, silica sand, garnet, crushed nut shells, fruit kernels, corn, corn starch, wheat starch, sodium bicarbonate, dry ice, polymeric particles, polymeric compounds, steel shot, steel grit, stainless steel shot, cut wire, copper shot, aluminum shot, and zinc shot. However, it should be understood that any type of particulate may be employed.

In one embodiment, the bottom surface 430 of the precured tire tread 400 is also air blasted with compressed gas. The step of air blasting may be employed to remove particulates from the bottom surface 430 of the precured tire tread 400. The step of air blasting may also be employed to cool the precured tire tread 400. In one embodiment, the step of air blasting is performed by the same nozzle 460 that performed the abrasive blasting. In an alternative embodiment (not shown), a different nozzle may be employed. The gas in the air blasting step may be ejected from the nozzle at a lower pressure than the gas ejected from the nozzle during the abrasion blasting step. In an alternative embodiment, the step of air blasting may be omitted.

In one embodiment, the bottom surface 430 of the precured tire tread 400 is also washed with a liquid, such as water. The washing step may be employed to remove particulates from the bottom surface 430 of the precured tire tread 400. The washing step may also be employed to cool the precured tire tread 400. In one embodiment, the washing step is performed by the same nozzle 460 that performed the abrasive blasting. In an alternative embodiment (not shown), a different nozzle may be employed. After washing, the precured tread 400 may optionally be air blasted to remove excess liquid. In an alternative embodiment, the washing step may be omitted.

The resulting precured tire tread 400 has a bottom surface that is substantially devoid of nonstick surface agents. For this reason, cement or an adhesive will be more effective on the prepared bottom surface.

Figure 5:
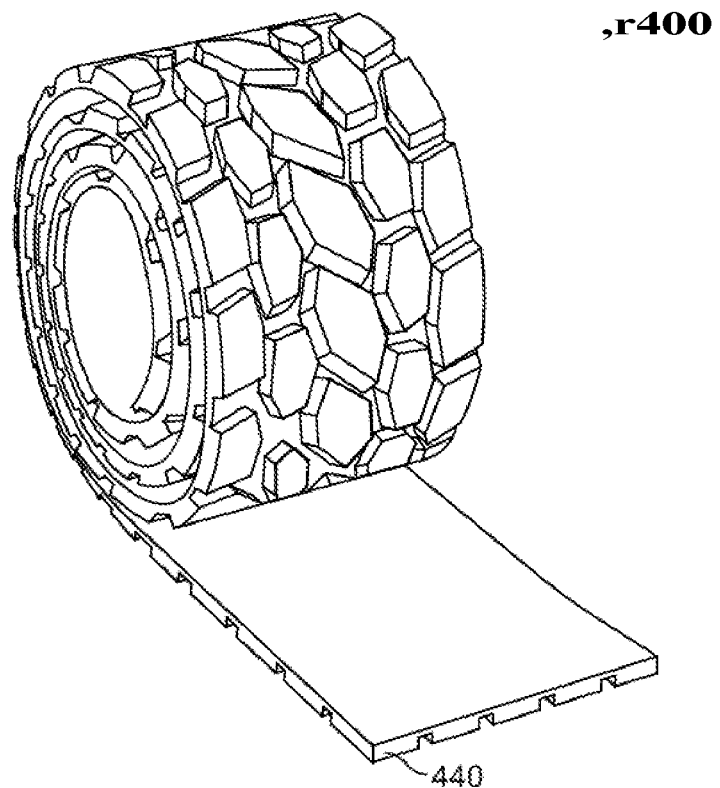
FIG. 5 is a perspective view of one embodiment of a rolled of precured tire tread.

The precured tire tread 400 may be used in a retreading process. In one embodiment, the retreading process may be performed at the same location where the precured tread is formed. In an alternative embodiment, the precured tread 400 may be shipped to a remote location for the retreading process. In one embodiment, the precured tire tread 400 is rolled in the manner shown in FIG. 5. As one of ordinary skill in the art would understand, in some instances it may be easier to transport a rolled precured tire tread than a flat precured tire tread. In other instances, it may be preferable to leave the precured tire tread in a flat formation.

Figure 6:
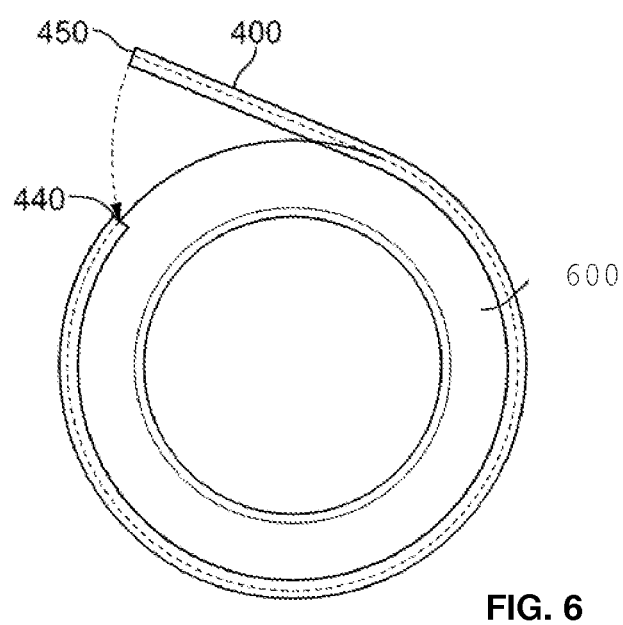
FIG. 6 is a schematic drawing of a side view of a precured tire tread being applied to a tire casing.

FIG. 6 illustrates a side view of a tire casing 600 receiving a portion of the precured tire tread 400. In one embodiment, the tire casing 600 has an existing tread that is partially worn. In such cases, the existing tread may be buffed to a desired height.

In one embodiment, the retreading process includes applying an adhesive to the tire casing 600, the bottom surface 430 of the precured tire tread 400, or to both the tire casing 600 and the bottom surface 430 of the precured tire tread 400. Exemplary adhesives include, without limitation, materials with compositions based on elastomers, such as natural or synthetic rubbers, or blends of such polymers. In addition, the adhesives may be based on materials such as urethanes, epoxies, and acrylates. Further, the adhesives may be based on the curatives or activating agents of the above.

In an alternative embodiment, the retread process includes applying a cement to the tire casing 600, the bottom surface 430 of the precured tire tread 400, or to both the tire casing 600 and the bottom surface 430 of the precured tire tread 400. The cement may be used in conjunction with green rubber based adhesives to maintain contact of the components of the composite tire prior to curing.

Cements may use solvent or water as the dispersing phase for the cement materials. The solvent based cement is comprised of a specialized rubber compound that may be dissolved or suspended in an organic solvent. The water based cements may be comprised of emulsified or suspended polymers combined with suspensions or emulsions of additives.

In the case where a cement or adhesive is applied to both the tire casing 600 and the bottom surface 430 of the precured tire tread 400, the same cement or adhesive may be applied to both surfaces. Alternatively, a different cement or adhesive may be applied to each surface. For example, a first cement may be applied to the tire casing 600 and a second cement may be applied to the precured tire tread 400, where both cements have properties that cause them to remain in contact with the uncured rubber adhesive. Once the tire composite is assembled (using the cemented components) the bonding may take place. Such bonding may begin or occur rapidly on contact, or with the application of temperature or pressure above a threshold amount.

In an alternative embodiment, no cement or adhesive is applied to the tire casing 600 or to the bottom surface 430 of the precured tire tread 400.

In any of the above described embodiments, the process may also include applying a cement or adhesive to the front surface 440 of the precured tire tread 400, the rear surface 450 of the precured tire tread 400, or both the front and rear surfaces 440, 450 of the precured tire tread 400.

In the case where a cement or adhesive is applied to both the front and rear surfaces 440, 450 of the precured tire tread 400, the same cement or adhesive may be applied to both surfaces. Alternatively, a different cement or adhesive may be applied to each surface.

The retreading process further includes winding the precured tire tread 400 circumferentially around the tire casing 600 such that the front surface 440 of the precured tire tread 400 abuts the rear surface 450 of the precured tire tread 400. In some instances, the precured tire tread 400 may have a length that is greater than the outer circumference of the tire casing 600. In such cases, the precured tire tread 400 may be cut to a desired length. An abrasion knife may be used to cut the precured tire tread 400, such that the new rear surface is roughened.

In other instances, the precured tire tread 400 may have a length that is less than the outer circumference of the tire casing 600. In such cases, a second precured tire tread (not shown) may be inserted to fill the gap between the front surface 440 and the rear surface 450 of the precured tire tread 400. It may be necessary to cut the second precured tire tread to an appropriate length. Cements or adhesives may be applied in any of the manners described above.

After the precured tire tread 400 has been wound circumferentially around the tire casing 600, the combined tire casing 600 and precured tire tread 400 is cured in a pressure chamber (not shown). As one of ordinary skill in the art would understand, this curing process is done at relatively low temperatures and pressures, compared to the curing of a green tire. In one embodiment, the combined tire casing 600 and precured tire tread 400 is cured at a temperature of about 200° F. (100° C.) and a pressure of about 90 PSI (600 kPa). In other embodiments, the combined tire casing 600 and precured tire tread 400 is cored at a temperature between 200 to 300° F. (100 to 150° C.) and a pressure between 70 to 120 PSI (480 to 830 kPA).

After the curing process, the cured tire is removed and may be used on a vehicle.

It should be understood that different steps of the process described above may be performed at different locations. For example, the precured tire tread 400 may be formed at a first location and shipped to a second location that is remote from the first location. The precured tire tread 400 may then be applied to a tire casing 600 at a second location. In the above described example, the buffing or roughening steps may be performed at the first location. Alternatively, the buffing or roughening of the tread ends may be performed at the second location.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed:

1. A method of preparing a precured tire tread, the method comprising:
   forming a green rubber mixture;
   extruding the green rubber mixture into a green tire tread strip having a top surface and a bottom surface;
   placing the green tire tread strip in a tire tread vulcanization mold;
   curing the green tire tread strip to form a precured tire tread having a top surface and a bottom surface, wherein the curing includes applying heat of at least 150° C.;
   removing the precured tire tread from the tire tread vulcanization mold while the precured tire tread has a temperature of at least 120° C.;
   abrasive blasting the bottom surface of the precured tire tread while the precured tire tread has a temperature of at least 80° C.; and
   applying a cement to the bottom surface of the precured tire tread, wherein the cement is selected from the group consisting of a solvent based cement and a water based cement.

2. The method of claim 1, further comprising rolling the precured tire tread into a roll.

3. The method of claim 1, further comprising shipping the precured tire tread to a remote location.

4. The method of claim 1, wherein the abrasive blasting the bottom surface of the precured tire tread includes forcibly propelling particulates against the bottom surface, wherein the particulates are selected from the group consisting of sand, silica sand, garnet, crushed nut shells, fruit kernels, corn, corn starch, wheat starch, sodium bicarbonate, dry ice, steel shot, steel grit, stainless steel shot, cut wire, copper shot, aluminum shot, and zinc shot.

5. The method of claim 4, further comprising removing the particulates from the bottom surface of the precured tire tread by air blasting the bottom surface.

6. The method of claim 1, further comprising washing the bottom surface of the precured tire tread with a liquid.

7. The method of claim 6, further comprising removing excess liquid from the bottom surface of the precured tire tread by air blasting the bottom surface.

8. The method of claim 1, wherein the abrasive blasting the bottom surface of the precured tire tread includes abrasive blasting the bottom surface with solidified gas.

9. A method of preparing a precured tire tread, the method comprising:
   forming a green tire tread strip having a top surface and a bottom surface;
   curing the green tire tread strip to form a precured tire tread having a top surface and a bottom surface;
   abrasive blasting the bottom surface of the precured tire tread while the precured tire tread has a temperature of at least 80° C.;
   air blasting the bottom surface of the precured tire tread;
   washing the bottom surface of the precured tire tread with a liquid; and
   applying a cement to the bottom surface of the precured tire tread, wherein the cement is selected from the group consisting of a solvent based cement and a water based cement.

10. The method of claim 9, wherein the abrasive blasting the bottom surface of the precured tire tread is performed while the precured tire tread has a temperature of at least 120° C.

11. A method of retreading a tire, the method comprising:
    providing a tire casing;
    providing a green tire tread strip having a bottom surface, a first end, and a second end;
    curing the green tire tread strip to form a precured tire tread having a top surface and a bottom surface, wherein the curing includes applying heat of at least 150° C.;
    abrasive blasting the bottom surface of the precured tire tread while the precured tire tread has a temperature of at least 80° C.;
    applying a cement to at least one of the tire casing and the bottom surface of the precured tire tread, wherein the cement is selected from the group consisting of a solvent based cement and a water based cement; and
    winding the precured tire tread around the tire casing.

12. The method of claim 11, further comprising buffing an existing tread of the tire casing.

13. The method of claim 11, wherein the abrasive blasting the bottom surface of the precured tire tread is performed while the precured tire tread has a temperature of at least 120° C.

14. The method of claim 11, further comprising air blasting the bottom surface of the precured tire tread.

15. The method of claim 11, further comprising washing the bottom surface of the precured tire tread.

16. The method of claim 11, wherein the cement is a solvent based cement including a rubber compound dissolved in an organic solvent.

17. The method of claim 11, wherein the cement is a solvent based cement including a rubber compound suspended in an organic solvent.

18. The method of claim 11, wherein the cement is a water based cement including emulsified polymers combined with emulsions of additives.

19. The method of claim 11, wherein the cement is a water based cement including suspended polymers combined with suspensions of additives.

20. The method of claim 11, wherein the cement is a water based cement including emulsified polymers combined with suspensions of additives.

* * * * *